US012480631B2

(12) United States Patent
Su

(10) Patent No.: US 12,480,631 B2
(45) **Date of Patent: *Nov. 25, 2025**

(54) DECORATIVE LAMP

(71) Applicant: Lin Su, Hunan Province (CN)

(72) Inventor: Lin Su, Hunan Province (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/969,972

(22) Filed: Dec. 5, 2024

(65) Prior Publication Data

US 2025/0334237 A1 Oct. 30, 2025

Related U.S. Application Data

(63) Continuation-in-part of application No. 18/644,787, filed on Apr. 24, 2024, now Pat. No. 12,188,627.

(51) Int. Cl.

| | |
|---|---|
| ***F21S 8/06*** | (2006.01) |
| ***F21S 4/22*** | (2016.01) |
| ***F21S 9/02*** | (2006.01) |
| ***F21V 23/04*** | (2006.01) |
| ***F21V 23/06*** | (2006.01) |
| ***F21V 31/00*** | (2006.01) |
| ***F21W 121/00*** | (2006.01) |

(52) U.S. Cl.

CPC . *F21S 8/06* (2013.01); *F21S 4/22* (2016.01); *F21S 9/02* (2013.01); *F21V 23/04* (2013.01); *F21V 23/06* (2013.01); *F21V 31/005* (2013.01); *F21W 2121/00* (2013.01)

(58) Field of Classification Search

CPC . F21V 1/06; F21V 23/04; F21V 23/06; F21V 31/005; F21S 4/22; F21S 8/06; F21S 9/02; F21W 2121/00

USPC .......................................................... 362/362

See application file for complete search history.

(56) References Cited

U.S. PATENT DOCUMENTS 3,704,366 A * 11/1972 Korb ........................ F21S 4/10 428/18
8,678,615 B1 * 3/2014 Ko ........................... F21S 4/10 362/403
12,188,627 B1 * 1/2025 Su ......................... F21V 17/108

FOREIGN PATENT DOCUMENTS

CN 106871024 A * 6/2017 ................ F21V 5/00
DE 29911692 U1 * 11/2000 ............. A47G 33/00

* cited by examiner

*Primary Examiner* — Laura K Tso

(57) ABSTRACT

A decorative lamp includes: a hanging decorative component for hanging the decorative lamp in the air; a connecting component connected to the hanging decorative component, the connecting component being a flexible component; and a decorative component connected to the connecting component. At least one of the hanging decorative component, the connecting component, and the decorative component is provided with light emitting units for emitting light. By configuring the connecting component as a flexible component, the connecting component, the hanging decorative component and the decorative component can be folded together during transportation, so as to effectively reduce volume, facilitate transportation, and reduce transportation costs. Moreover, when the light emitting units are emitting light, a lighting effect can be achieved.

15 Claims, 17 Drawing Sheets

DECORATIVE LAMP

CROSS-REFERENCE TO RELATED APPLICATIONS

This application is a Continuation-in-Part of the U.S. application Ser. No. 18/644,787 filed on Apr. 24, 2024, and entitled "DECORATIVE LAMP," the entire disclosures of which are incorporated herein by reference.

TECHNICAL FIELD

The present invention relates to a technical field of decorations, in particular to a decorative lamp.

BACKGROUND

With the improvement of living standards, people usually assemble decorations in the environment to create a scene. However, at present, existing decorations with light emitting functions, especially those hung in the air, are bulky and non-foldable, making the decorations inconvenient for transportation and user storage.

SUMMARY

A main purpose of the present invention is to provide a decorative lamp for solving a problem of inconvenient transportation and storage caused by the large volume of existing light emitting decorative hanging products.

In order to solve the above-mentioned technical problem, a technical solution is provided by the present invention.

A decorative lamp, includes: a hanging decorative component for hanging the decorative lamp in the air; a plurality of connecting components connected to the hanging decorative component, the connecting components being flexible components; and a decorative component connected to the connecting components. At least two of the connecting components are in a folded state along a direction close to the decorative component. At least one of the hanging decorative component, each connecting component, and the decorative component is provided with a light emitting unit for emitting light.

Furthermore, the hanging decorative component is flat; the hanging decorative component includes a first housing body and a second housing body; in a stored state, the first housing body and the second housing body are folded in half; and in an unfolded state, the first housing body and the second housing body are horizontally arranged side by side on the left and the right.

Furthermore, the first housing body and the second housing body are rotatably arranged.

Furthermore, the first housing body and the second housing body are rotatably connected through a hinge.

Furthermore, the hanging decorative component further includes connecting housing bodies; two ends of the connecting housing bodies are respectively detachably connected to the first housing body and the second housing body; and a hook is arranged on one of the connecting housing bodies, the first housing body, or the second housing body.

Furthermore, a first clamping block is arranged on a side of the first housing body close to the connecting housing bodies; a second clamping block is arranged on a side of the second housing body close to the connecting housing bodies; a first clamping position and a second clamping position of the connecting housing bodies are respectively provided in positions corresponding to the first clamping block and the second clamping block; the first clamping block is arranged in the first clamping position when the connecting housing bodies are connected to the first housing body; and the second clamping block is arranged in the second clamping position when the connecting housing bodies are connected to the second housing body.

Furthermore, the decorative component includes at least one ring component; and at least two of the connecting components are connected to the ring component.

Furthermore, two ring components are included; the decorative component further includes an intermediate body and supporting arms respectively connected to two sides of the intermediate body; the two supporting arms are each connected to one ring component; and the supporting arms are detachably connected to the ring components.

Furthermore, tape bodies are arranged on the supporting arms; two ends of the tape bodies are detachably connected; and when the tape bodies sleeve the ring components, the two ends of the tape bodies are connected.

Furthermore, a circuit board electrically connected to the light emitting unit and configured to control the light emitting unit is arranged in the control box.

Furthermore, the control box is provided with a function button electrically connected to the circuit board; and the circuit board adjusts power output to the light emitting unit and/or switches a light emitting mode of the light emitting unit when the function button is operated.

Furthermore, a battery electrically connected to the circuit board is arranged in the control box.

Furthermore, the control box is provided with a first connecting terminal electrically connected to the circuit board; the decorative lamp further includes a second connecting terminal electrically connected to the light emitting unit; the first connecting terminal is detachably connected to the second connecting terminal; and the circuit board is electrically connected to the light emitting unit when the first connecting terminal is connected to the second connecting terminal.

Furthermore, a solar panel electrically connected to the circuit board is arranged on the control box; and the solar panel is configured to: convert solar energy into electrical energy and store the electrical energy in batteries through the circuit board.

Furthermore, the control box includes a plug electrically connected to the circuit board and configured to be connected to an external socket to introduce a power supply.

Furthermore, the decorative lamp further includes a third connecting terminal electrically connected to the light emitting unit; the control box further includes a fourth connecting terminal electrically connected to the circuit board; the fourth connecting terminal is detachably connected to the third connecting terminal; and the circuit board is electrically connected to the light emitting unit when the fourth connecting terminal is connected to the third connecting terminal.

Furthermore, the hanging decorative component is a 3D parachute; the 3D parachute includes a flexible surface, a plurality of supporting rods arranged on the flexible surface, and a fixing assembly; the fixing assembly is configured to lock the plurality of supporting rods to support unfolding of the flexible surface when the flexible surface is unfolded; in the stored state, the flexible surface is folded along a central axis surrounded by the plurality of supporting rods; and the connecting components are connected to the flexible surface or the supporting rods.

Furthermore, the fixing assembly includes a base and a panel detachably connected to the base; the panel is provided with a hook; the flexible surface is provided with a second via hole; the base is provided with a plurality of limiting slots for limiting the supporting rods; when the fixing assembly is assembled to the flexible surface, the plurality of supporting rods are each placed in one limiting slot; the base is located on an inner side of the flexible surface; and the panel is located on an outer side of the flexible surface.

Furthermore, the panel is provided with a screw hole; the base is provided with a screw rod; and the screw rod passes through the second via hole and is screwed up in the screw hole when the panel is assembled with the base.

Furthermore, the decorative lamp is shaped like a fire balloon; the hanging decorative component has an umbrella cover appearance of the fire balloon; the plurality of connecting components are pull ropes of the fire balloon; the decorative component is a hanging basket; top ends of the connecting components are connected to the umbrella cover appearance; and bottoms of the connecting components are connected to the hanging basket.

Compared to existing technology, in the present invention, by configuring the connecting components as the flexible component, the connecting components, the hanging decorative component and the decorative component can be folded together during transportation, so as to effectively reduce volume, facilitate transportation and reduce transportation costs. Moreover, when the light emitting units are emitting light, a lighting effect can be achieved.

BRIEF DESCRIPTION OF THE DRAWINGS

Implementations of the present disclosure will now be described, by way of embodiment, with reference to the attached figures. It should be understood, the drawings are shown for illustrative purpose only, for ordinary person skilled in the art, other drawings obtained from these drawings without paying creative labor by an ordinary person skilled in the art should be within scope of the present disclosure.

DETAILED DESCRIPTION OF THE EMBODIMENTS

Figure 1:
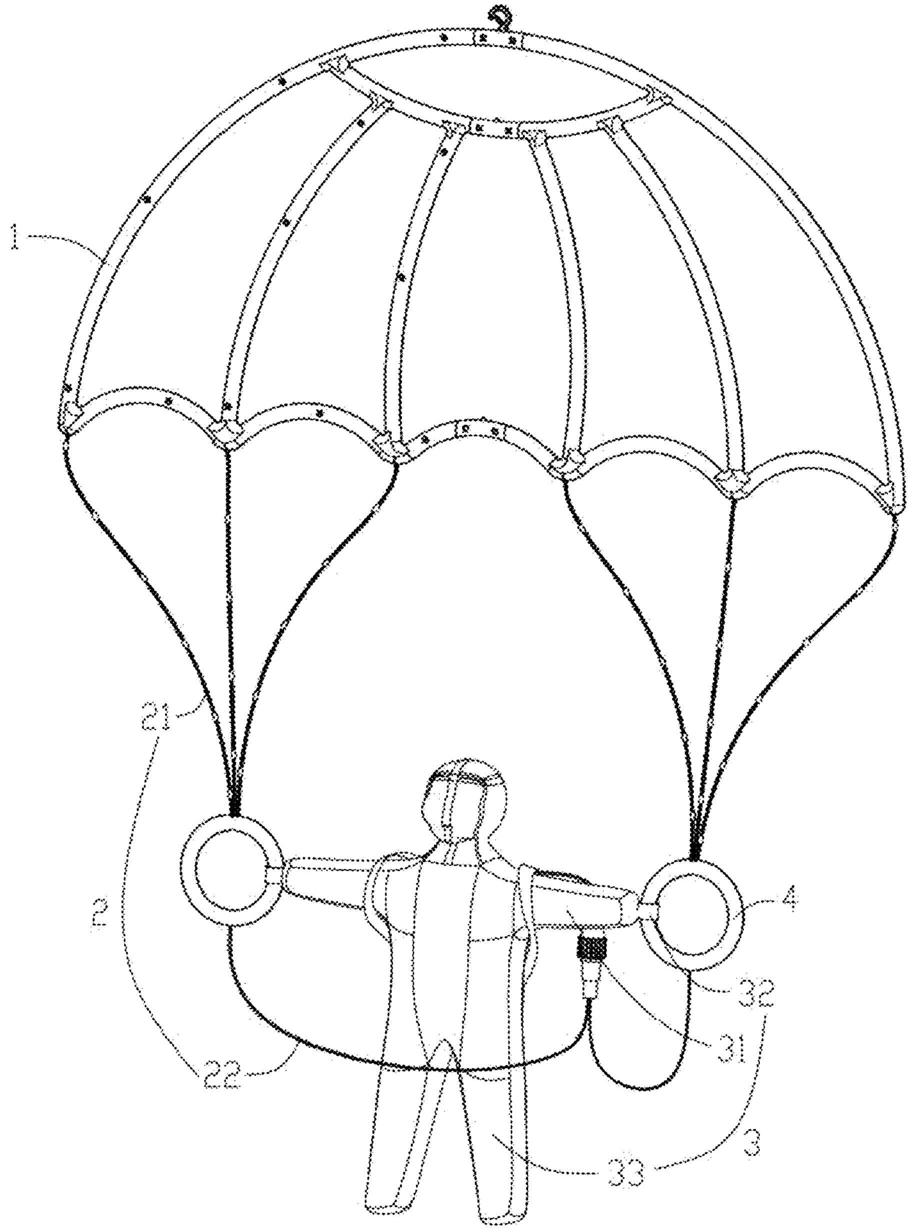
FIG. 1 is a perspective view of one embodiment according to the present invention.
Figure 2:
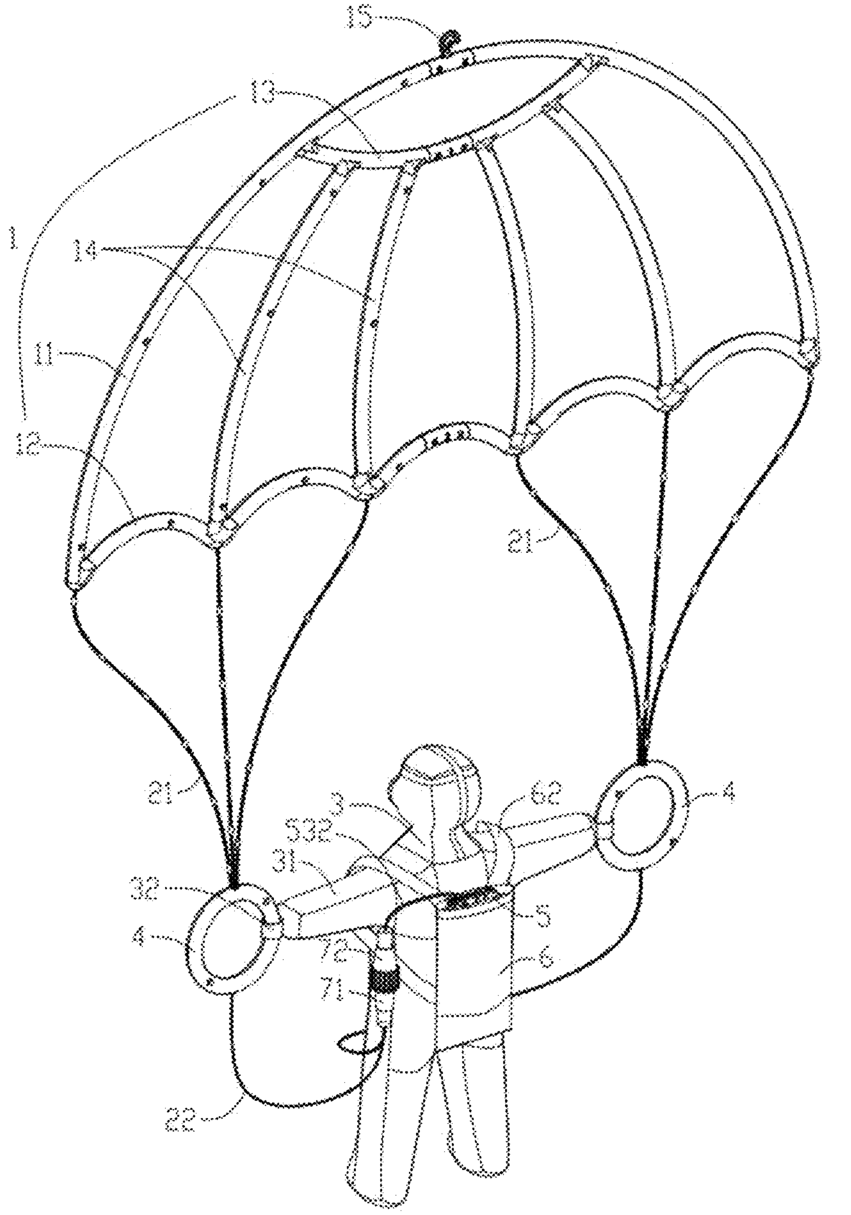
FIG. 2 is a perspective view of one embodiment from another perspective according to the present invention.
Figure 3:
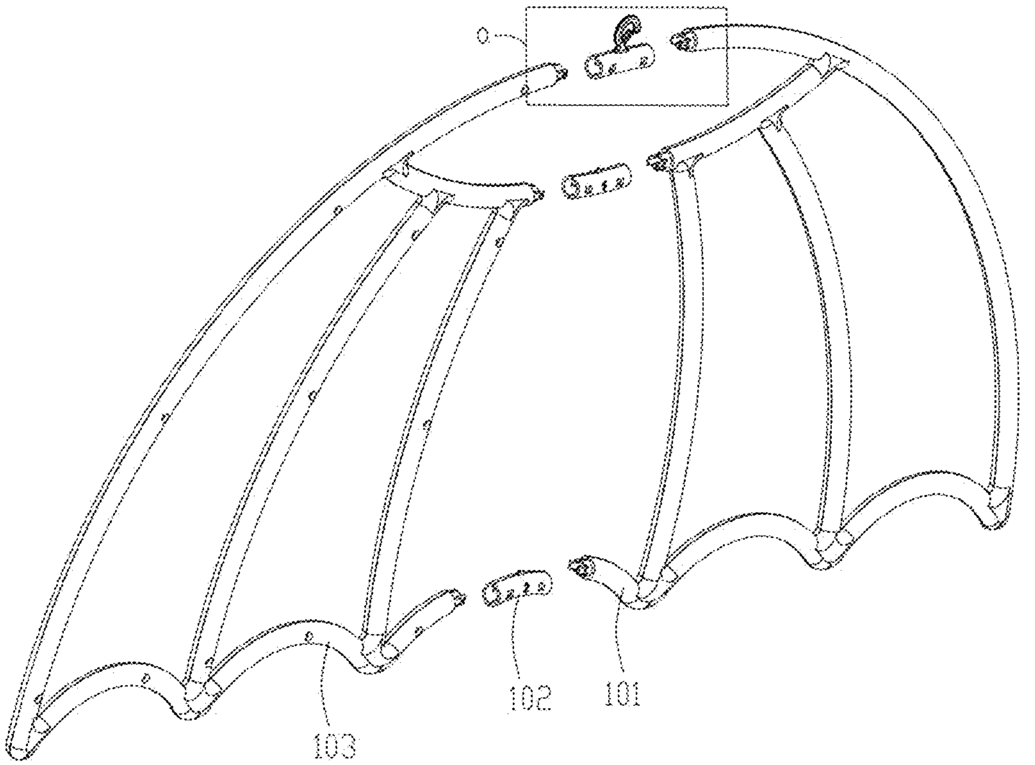
FIG. 3 is a partial exploded view of a hanging decorative component in one embodiment according to the present invention.
Figure 4:
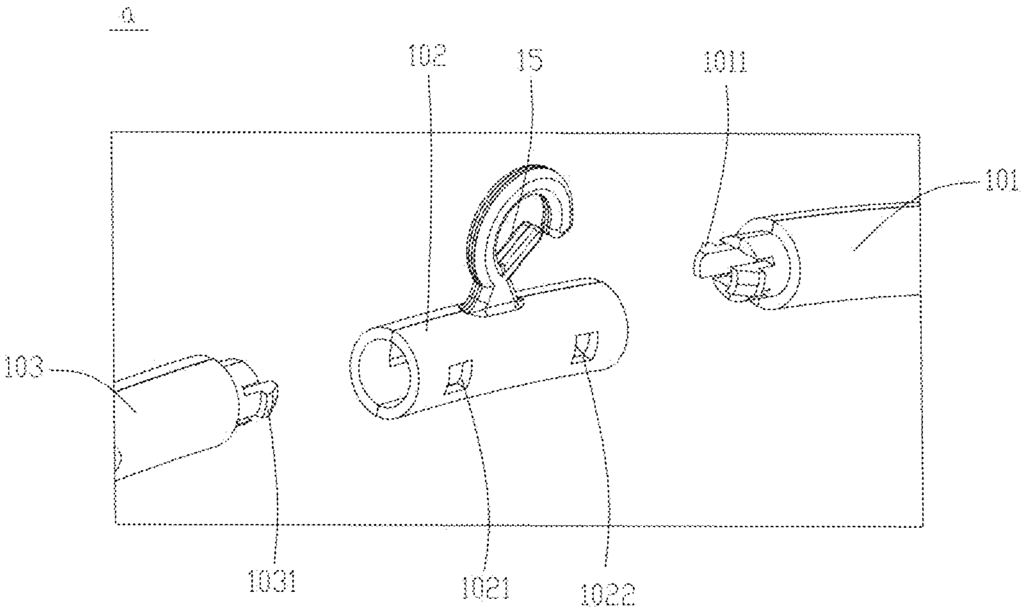
FIG. 4 is an enlarged view of area a in FIG. 3.

The technical solutions in the embodiments of the present disclosure will be clearly and completely described below in conjunction with the accompanying drawings in the embodiments of the present disclosure. Apparently, the described embodiments are only a part of the embodiments of the present disclosure, rather than all the embodiments. Based on the embodiments in the present disclosure, all other embodiments obtained by those ordinarily skilled in the art without doing creative work shall fall within the protection scope of the present disclosure.

FIGS. 1-17 show a decorative lamp according to embodiments of the present invention.

Referring to FIGS. 1-8, the decorative lamp includes: a hanging decorative component 1 for hanging the decorative lamp in the air; a connecting component 2 connected to the hanging decorative component 1, the connecting component 2 being a flexible component; and a decorative component 3 connected to the connecting component 2. At least one of the hanging decorative component 1, the connecting component 2, and the decorative component 3 is provided with light emitting units 23 for emitting light.

In this embodiment, by configuring the connecting component 2 as a flexible component, the connecting component 2, the hanging decorative component 1 and the decorative component 3 can be folded together during transportation, so as to effectively reduce volume, facilitate transportation and reduce transportation costs. Moreover, when the light emitting units 23 are emitting light, a lighting effect can be achieved.

Specifically, a plurality of connecting components 2 are provided, and at least two of the connecting components 2 are in a folded state along a direction close to the decorative component 3.

That is, at least two of the connecting components 2 gradually approach in the direction close to a bottom and are in a gathered state. The connecting components 2 can cooperate with the hanging decorative component 1 to roughly form a shape like a parachute or a fire balloon.

The light emitting unit 23 can be a light string or composed of a plurality of light emitting elements. The light emitting elements may be light beads, bulbs, and the like.

The light emitting unit 23 is arranged on the hanging decorative component 1, namely, neither the connecting components 2 nor the decorative component 3 has the light emitting unit 23. Certainly, in other embodiments, the light emitting unit 23 can also be arranged on the hanging decorative component 1 and the decorative component 3, namely, no light emitting unit 23 is not arranged on the connecting components 2. Or, the light emitting unit 23 can only be arranged on the connecting components 2, and no light emitting unit 23 is arranged on the hanging decorative component 1 and the decorative component 3.

In one embodiment, each connecting component 2 is a light string, namely, the light emitting unit 23 is a light string. According to a luminous effect, the connecting components 2 may extend from tops to the hanging decorative component 1 and/or from bottoms to the decorative component 3 as needed. Certainly, the connecting components 2 may not extend to the hanging decorative component 1 or the decorative component 3. The connecting components 2 can be fixed on the hanging decorative component 1 and/or the decorative component 3 by glue or a tape.

In one embodiment, the hanging decorative component 1 is foldable, so that the hanging decorative component 1 is folded to further reduce the volume during product transportation.

In one embodiment, the connecting component 2 is a light string component. The light string component includes a plurality of first light strings 21, and at least one part of the first light strings 21 extends to the hanging decorative component 1, so that the hanging decorative component 1 can also have a lighting effect. Specifically, the hanging decorative component 1 is a decorative item and can create a scene in conjunction with the lighting effect. For example, when the hanging decorative component 1 is in a shape of a cloud, in conjunction with the lighting effect, a weather scene can be created. When the hanging decorative component 1 is in a shape of an animal, in conjunction with the lighting effect, a relaxed and cute scene can be created. A shape of the hanging decorative component 1 is not limited here.

In one embodiment, the decorative component 3 and the connecting components 2 are arranged detachably, thereby further facilitating product transportation and facilitating the production and manufacturing of the decorative lamp.

In one embodiment, the decorative component 3 includes at least one ring component 4. At least two of the connecting components 2 are connected to the ring component 4. The bottoms of the connecting components 2 can be folded using the ring components 4 to achieve that the at least two of the connecting components 2 are folded in the direction close to the decorative component 3.

In one embodiment, two ring components 4 are included. The decorative component 3 further includes an intermediate body 33 and supporting arms 31 respectively connected to two sides of the intermediate body 33. The two supporting arms 31 are each connected to one ring component 4. The supporting arms 31 can be equivalent to hands, and the intermediate body 33 can be equivalent to a body part. The supporting arms 31 and the intermediate body 33 can cooperate with the parachute-shaped hanging decorative component 1 and the connecting components 2 to form a parachuting scene. Specifically, the intermediate body 33 may be a Santa Claus, aviation personnel, and the like. Certainly, the decorative component 3 may have an appearance of an animal, a cartoon, or the like, and the specific shape of the decorative component 3 is not limited here.

In one embodiment, the supporting arms 31 are detachably connected to the ring components 4, so that during transportation, the supporting arms 31 can be separated from the ring components 4 to facilitate the package and transportation of the decorative lamp of this embodiment, and to facilitate the replacement of the shape of the supporting arms 31 and the intermediate body 33, thereby meeting user's needs for different appearances formed by the supporting arms 31 and the intermediate body 33.

Tape bodies 32 are arranged on the supporting arms 31. Two ends of the tape bodies 32 are detachably connected. When the tape bodies 32 sleeve the ring components 4, the two ends of the tape bodies 32 are connected. When the two ends of the tape bodies 32 are separated, the decorative component 3 can be removed from the ring components 4 to achieve removal of the decorative component 3 and removal of the connecting components 2. Specifically, a projection of each ring component 4 can be circular (i.e. a circular ring), square, triangular, pentagonal, in other polygonal or irregular shapes, and the like. The shape of the ring component 4 is not limited here.

In one embodiment, the tape bodies 32 may be hook and loop fasteners, namely, one surface of each tape body 32 is a hook surface and the other surface is a matte surface. When the hook and tape bodies 32 sleeve the ring components 4, the matte surfaces at least partially abut against the hook surfaces to achieve the detachable connection between the decorative component 3 and the connecting components 2. Certainly, in other embodiments, the two ends of the tape bodies 32 can also be detachably connected in a knotted manner, or in a magnetic attraction manner, or by using a button, a buckle, or a pin, or the like.

Figure 16:
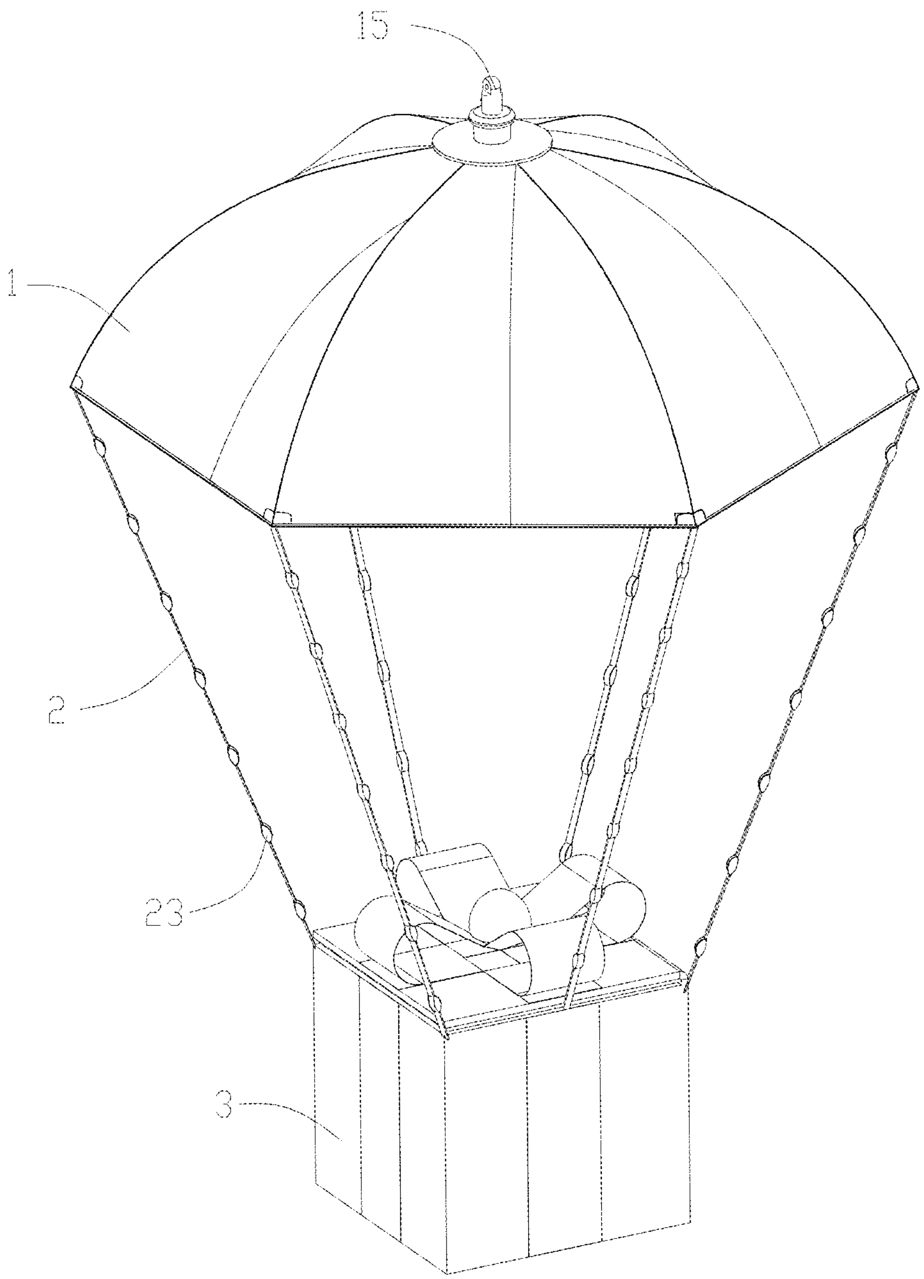
FIG. 16 is a schematic diagram of a decorative component being a gift box according to the present invention.
Figure 17:
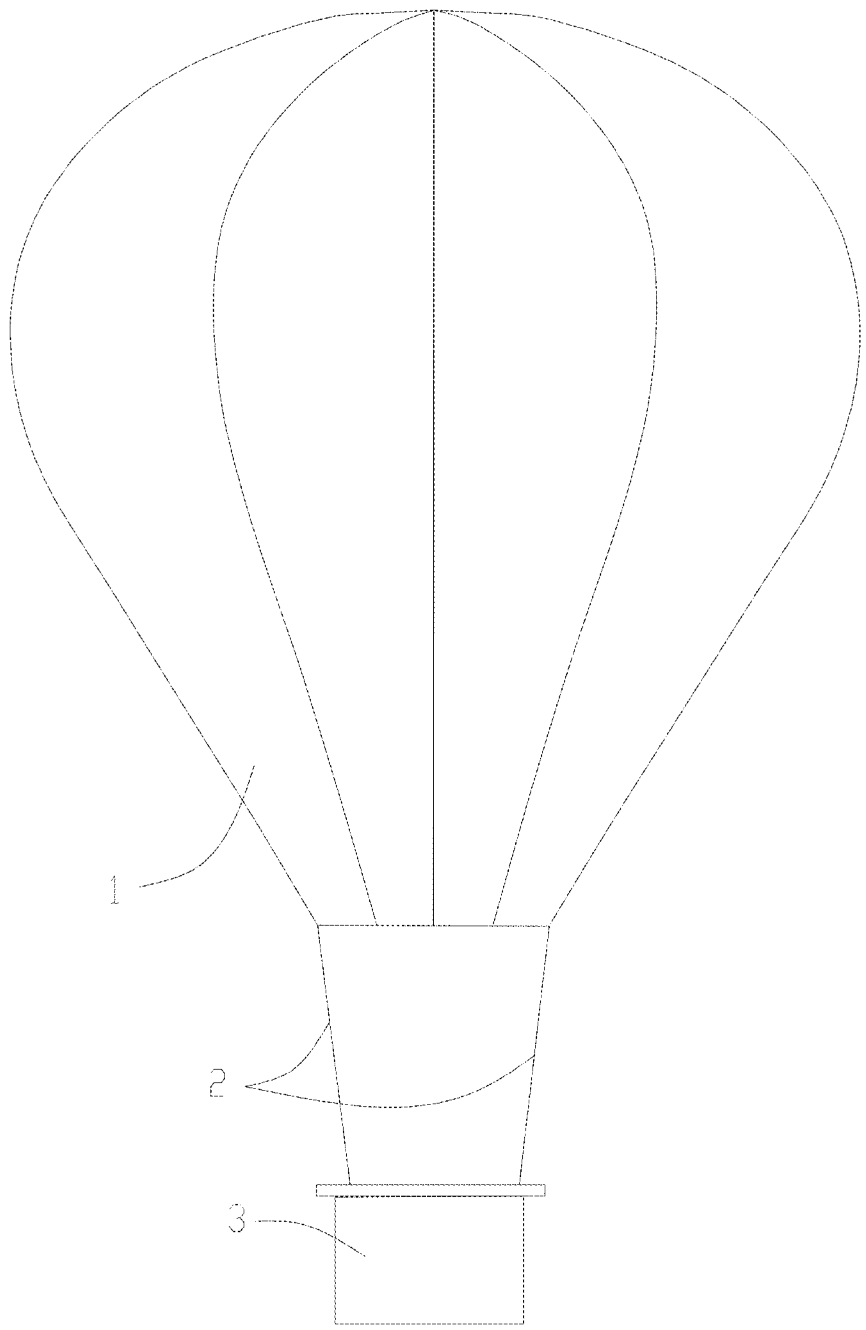
FIG. 17 is a schematic diagram of a fire balloon appearance according to the present invention.

Furthermore, in one embodiment without the ring components 4, the decorative component 3 may have an appearance of a gift box, a hanging basket, a cartoon character, an animal, and the like. The specific shape of the decorative component 3 is not limited here. When the decorative component 3 is a gift box, the decorative component 3 can cooperate with the parachute-shaped hanging decorative component 1 and the connecting components 2 to form a scene in which the gift box falls, as shown in FIG. 16.

Figure 12:
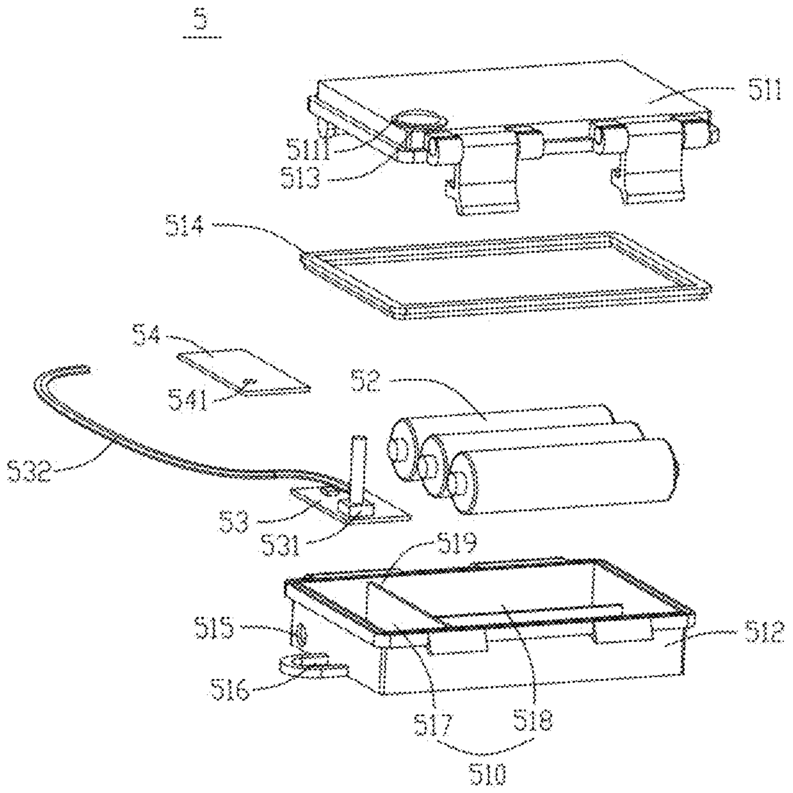
FIG. 12 is an exploded view of a control box in one embodiment according to the present invention.
Figure 13:
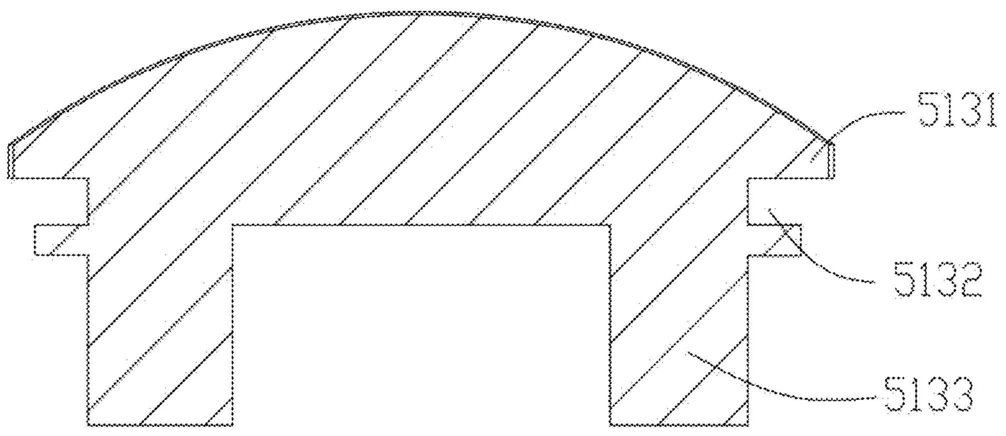
FIG. 13 is a structural diagram of a soft rubber element in one embodiment according to the present invention.

Referring to FIG. 12 and FIG. 13, in one embodiment, the decorative lamp further includes a control box 5. A circuit board 53 electrically connected to the light emitting unit 23 is arranged in the control box 5 to drive the light emitting unit 23 to emit light. Specifically, the circuit board 53 can be electrically connected to the first light string 21.

In one embodiment, batteries 52 electrically connected to the circuit board 53 are arranged in the control box 5. The batteries 52 are used to supply power to the circuit board 53. Furthermore, through the circuit board 53, the first light string 21 can be controlled to work, making the decorative lamp work independently, so that the tedious operation for connecting an external power supply is eliminated.

Referring to FIGS. 5-8, in one embodiment, annular components 4 are hollow. The annular components 4 include a first front housing 41 and a first bottom housing 42. The first bottom housing 42 is connected to the first front housing 41 to form an annular accommodating cavity 45. The annular components 4 are equipped with a wire inlet hole 43 and a wire outlet hole 44. Both the wire inlet hole 43 and the wire outlet hole 44 are in communication with the annular accommodating cavity 45. The light string component further includes second light strings 22. At least one part of the first light strings 21 is electrically connected to one of the second light strings 22 at one end away from the hanging decorative component 1. The circuit board 53 is electrically connected to the second light strings 22. A connection where the first light strings 21 are connected to the second light strings 22 is positioned in the annular accommodating cavity 45. The first light strings 21 pass through the wire inlet hole 43, and the second light strings 22 pass through the wire outlet hole 44. The annular components 4 are used for covering the connection where the plurality of first light strings 21 are connected to the second light strings 22, thereby improving the aesthetics of the decorative lamp in this embodiment and facilitating an electrical connection of the light string component and the circuit board 53.

A plurality of first position limiting columns 423 are arranged inside the annular accommodating cavity 45. The first position limiting columns 423 are provided with first position limiting openings 422. The first light strings 21 or the second light strings 22 are placed inside the first position limiting openings 422. The first position limiting openings 422 are used for limiting a position of the light string component, thereby facilitating a connection between the first front housing 41 and the first bottom housing 42.

Specifically, in one embodiment, the first front housing 41 and the first bottom housing 42 can be fixed via buckles, screws, etc. The connection where the first light strings 21 are connected to the second light strings 22 can be waterproof by gluing or wrapping waterproof tape, etc.

In one embodiment, a total number of the annular components 4, a total number of the second light strings 22, and a total number of the supporting arms 31 are all two. Each of the supporting arms 31 is configured corresponding to one of the annular components 4, and each of the second light strings 22 is configured corresponding to one of the annular components 4. That is, when the decorative component 3 is a humanoid doll, the two supporting arms 31 are the arms. The two arms of the humanoid doll pull the annular components 4, in conjunction with the plurality of first light strings 21, a scene of the humanoid doll wearing a parachute to land can be formed. The humanoid doll can be Santa Claus, aviation personnel, etc. Of course, the decorative component 3 can also be in a form of animals. A specific shape of the decorative component 3 is not limited here.

Figure 5:
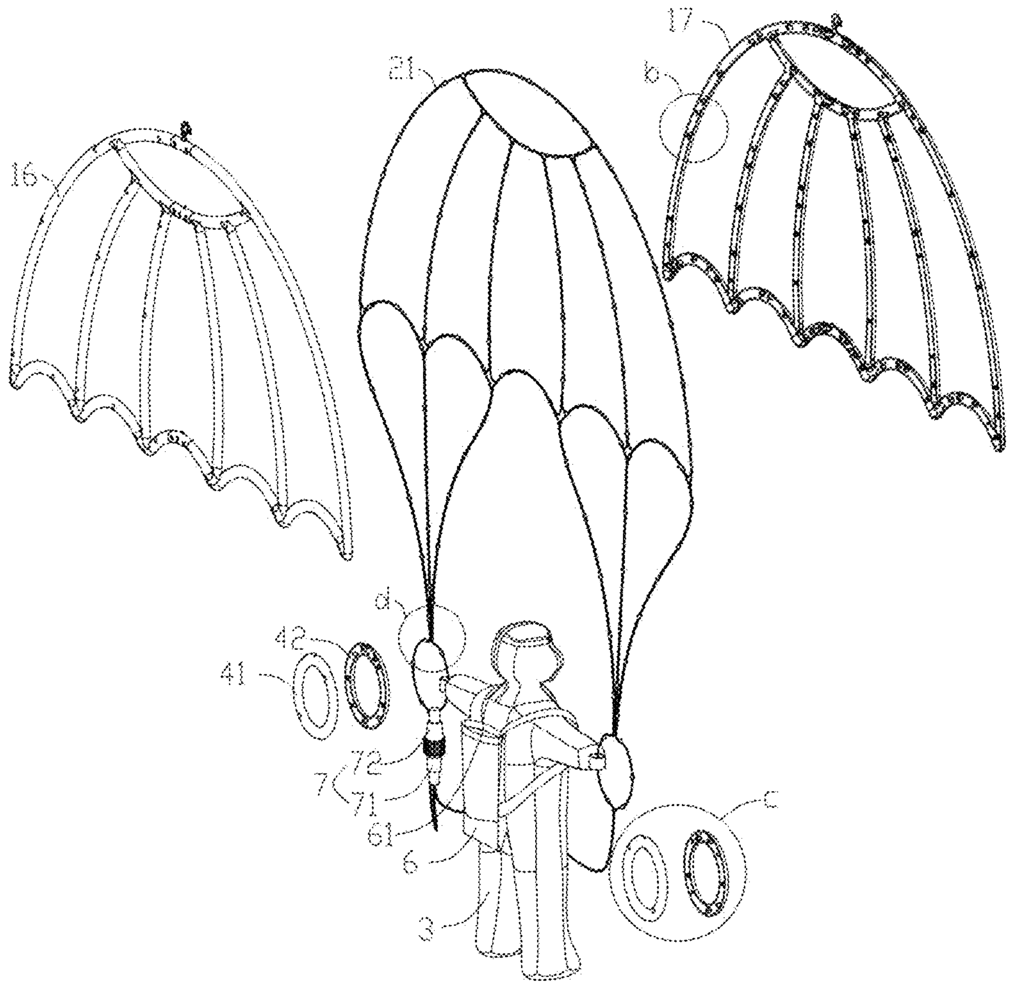
FIG. 5 is a partial exploded view of one embodiment according to the present invention.
Figure 6:
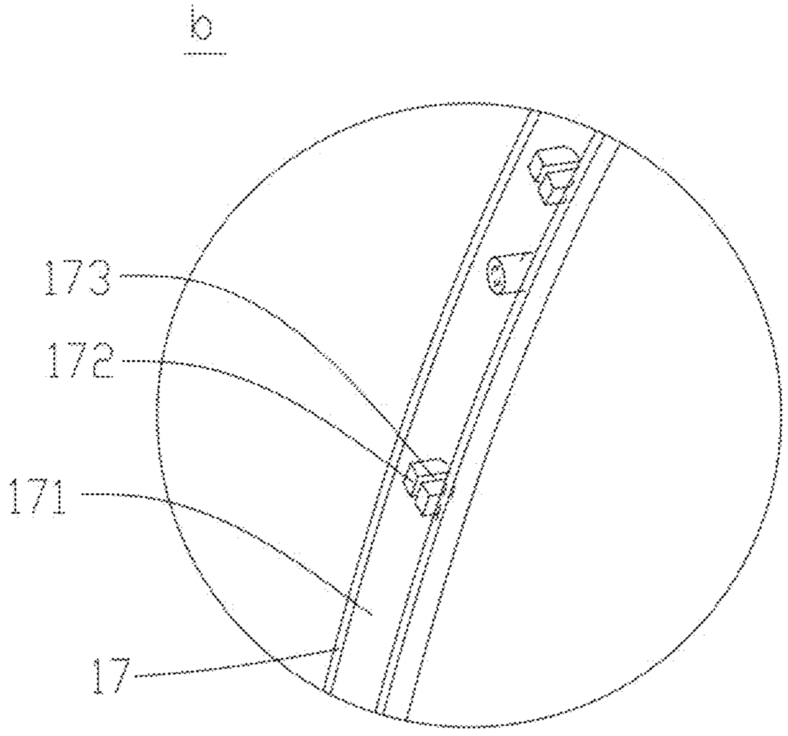
FIG. 6 is an enlarged view of area b in FIG. 5.
Figure 7:
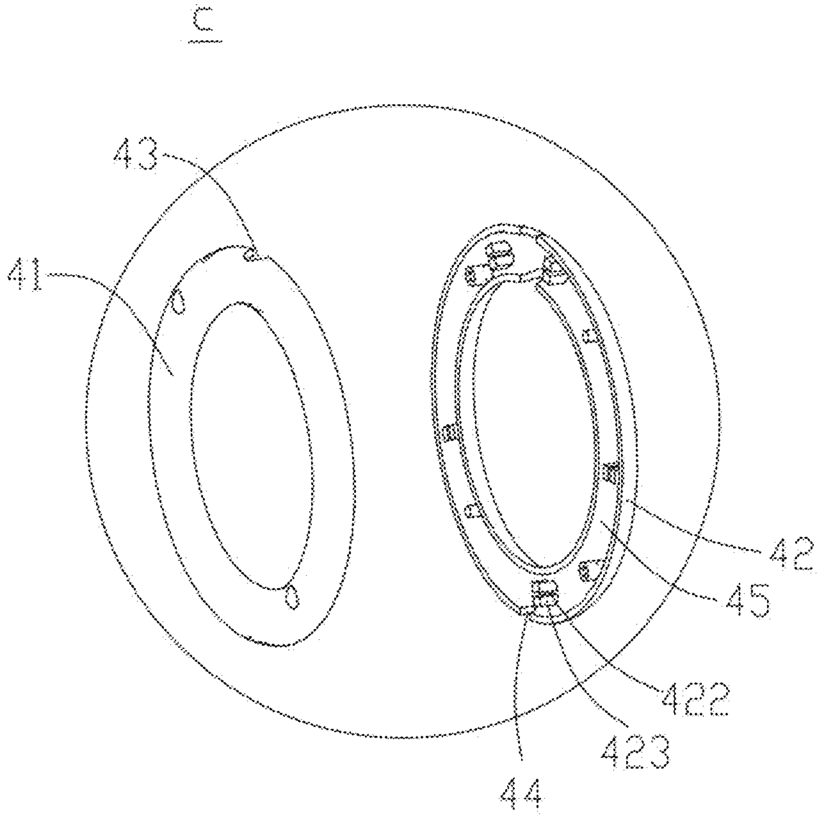
FIG. 7 is an enlarged view of area c in FIG. 5.
Figure 8:
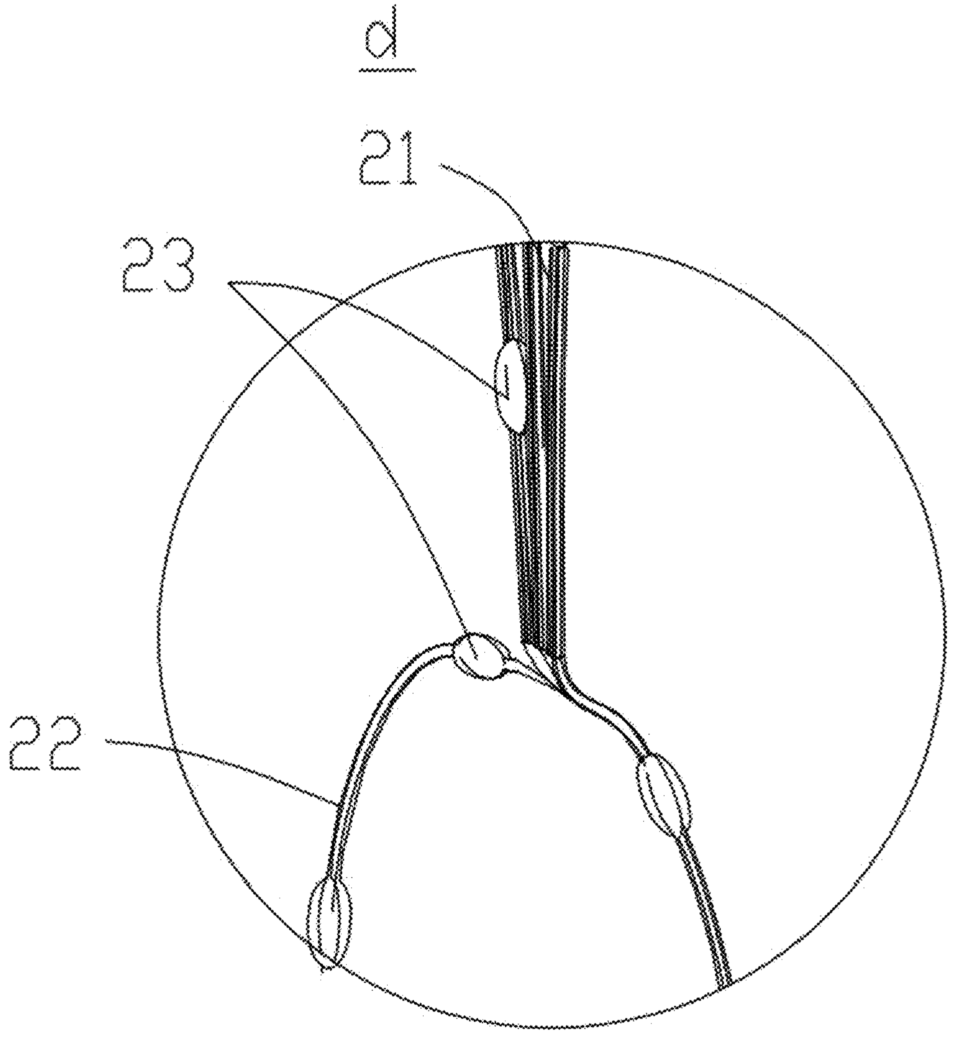
FIG. 8 is an enlarged view of area d in FIG. 5.

Referring to FIG. 5, in one embodiment, the control box 5 is provided with a wire 532 electrically connected to the circuit board 53. The wire 532 is provided with an electrical connector 7 at an end away from the control box 5. The electrical connector 7 includes a first connection terminal 72 and a second connection terminal 71. The first connection terminal 72 is electrically connected to the wire 532, and the second connection terminal 71 is used in conjunction with the first connection terminal 72. The second light strings 22 are electrically connected to the second connection terminal 71. When the second connection terminal 71 is used in conjunction with the first connection terminal 72, the second connection terminal 71 is electrically connected to the first connection terminal 72. The second connecting terminal 71 is detachably connected to the first connecting terminal 72 for storage of the decorative lamp of this embodiment when the decorative lamp is not in use. Furthermore, when the batteries 52 are run out of power, the control box 5 can be replaced, to prolong the service life of the decorative lamp of this embodiment. Certainly, in other embodiments, the first connecting terminal 72 can also be directly arranged on the control box 5, or even welded directly to the circuit board 53, without electrically connecting the circuit board 53 to the electrical connector 7 through the wire 532.

Figure 14:
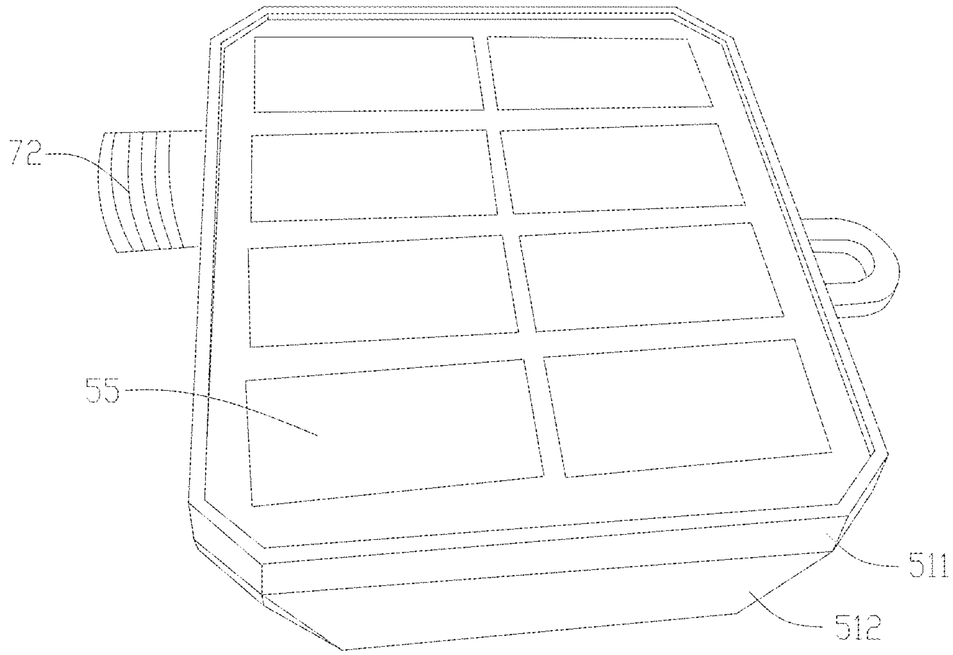
FIG. 14 is a schematic diagram of a control box in an embodiment according to the present invention.

Referring to FIG. 14, in one embodiment, the control box 5 is provided with a solar panel 55 that is electrically connected to the circuit board 53. The solar panel 55 is configured to convert solar energy into electrical energy and store the electric energy in the batteries 52 through the circuit board 53, so as to charge the batteries 52 and achieve an effect of saving energy.

In one embodiment, the control box 5 is provided with a charging interface. The charging interface is electrically connected to the circuit board 53. The charging interface is configured to be connected to an external power supply through a power cable and can charge the batteries 52 through the circuit board 53, to prolong the service life of the decorative lamp of this embodiment and save the cost of replacing the control box 5.

Referring to FIGS. 12-13, in one embodiment, the control box 5 includes a second bottom housing 512 and a second front housing 511. The second front housing 511 is connected to the second bottom housing 512 to form a first accommodating cavity 510. One side of the second front housing 511 is rotatably connected to the second bottom housing 512, and an opposite side of the second front housing 511 is detachably connected to the second bottom housing 512 for the assembly of the circuit board 53 and the batteries 52. The second bottom housing 512 is provided with a baffle board 519, and the first accommodating cavity 510 is separated by the baffle board 519 to form a first installation cavity 517 and a second installation cavity 518. The circuit board 53 is arranged in the first installation cavity 517, and the batteries 52 are arranged in the second installation cavity 518. The baffle board 519 is used for separating the batteries 52 from the circuit board 53.

In one embodiment, the control box 5 is semitransparent, and the first installation cavity 517 is equipped with a cover board 54 above the circuit board 53. The cover board 54 can cover the circuit board 53, improving the aesthetics of the control box 5. Moreover, the cover board 54 can limit a position of the circuit board 53, improving the compactness of a structure of the control box 5.

In one embodiment, the control box 5 is provided with a function button 531 electrically connected to the circuit board 53; and the circuit board 53 adjusts power output to the light emitting unit 23 and/or switches a light emitting mode of the light emitting unit when the function button 531 is operated. The function button 531 can adjust the brightness of the light emitting unit 23 and/or switch the light emitting mode when operated by a user, to achieve turning on, turning off, brightness adjustment on the first light string 21 and the second light string 22, switching of lighting modes of the first light string 21 and the second light string 22, and the like. Specifically, the light emitting mode may include a normally on mode, a flashing mode, a mode similar to a breathing lamp, and the like. Or, when the lighting unit 23 is a three-color lamp, the light emitting mode may also emit light in the same color or emit colored light. Specifically, the function button 531 may be an on/off button, a toggle switch, touch switch, and the like.

The cover board 54 is equipped with an avoidance hole 541 at a position corresponding to the function button 531, and the second front housing 511 is equipped with a first via hole 5111 at a position corresponding to the function button 531. The first via hole 5111 is equipped with a soft rubber element 513. The soft rubber element 513 can undergo deformation under external force, so that when users press the soft rubber element 513, the function button 531 can be pressed, and a waterproof effect can be achieved through the soft rubber element 513. A waterproof rubber ring 514 is arranged between the second bottom housing 512 and the second front housing 511 to achieve a waterproof function of the control box 5. A wiring hole 515 is provided on a side wall of the second bottom housing 512 at a position corresponding to the circuit board 53. The wire 532 passes through the wiring hole 515, and the control box 5 is sealed by using glue or configuring a rubber ring between the wire 532 and the second bottom housing 512.

In one embodiment, the soft rubber element 513 includes a soft rubber layer 5131 and a soft rubber enclosure wall 5133 extending downwards from the soft rubber layer 5131. A pressing element of the function button 531 is placed inside the soft rubber enclosure wall 5133. A bottom of the soft rubber enclosure wall 5133 abuts against the cover board 54 to tightly press the cover board 54. A clamping slot 5132 is provided on an outer side wall of the soft rubber layer 5131, and a side wall of the first via hole 5111 is placed inside the clamping slot 5132, so that the soft rubber element 513 is fixed at the avoidance hole 541 of the second front housing 511.

In one embodiment, the decorative component 3 is provided with a placement slot 61 for placing the control box 5. Therefore, when the decorative lamp in this embodiment is hung in the air, the control box 5 can be placed in the placement slot 61 to prevent a weight of the control box 5 from pulling the first light strings 21 and the second light strings 22, and to prevent an unsightly appearance caused by the control box 5 hung in the air, thereby improving a visual effect.

In one embodiment, the decorative component 3 is detachably equipped with a backpack 6, and the placement slot 61 is defined in the backpack 6. The backpack 6 is detachable, providing users with a sense of assembly and increasing an entertainment value of the decorative lamp.

In one embodiment, the backpack 6 is equipped with two shoulder straps 62. The two shoulder straps 62 are arranged on the supporting arms 31, so that when the decorative component 3 is connected to the connecting component 2, the backpack 6 is assembled onto the decorative component 3.

Figure 15:
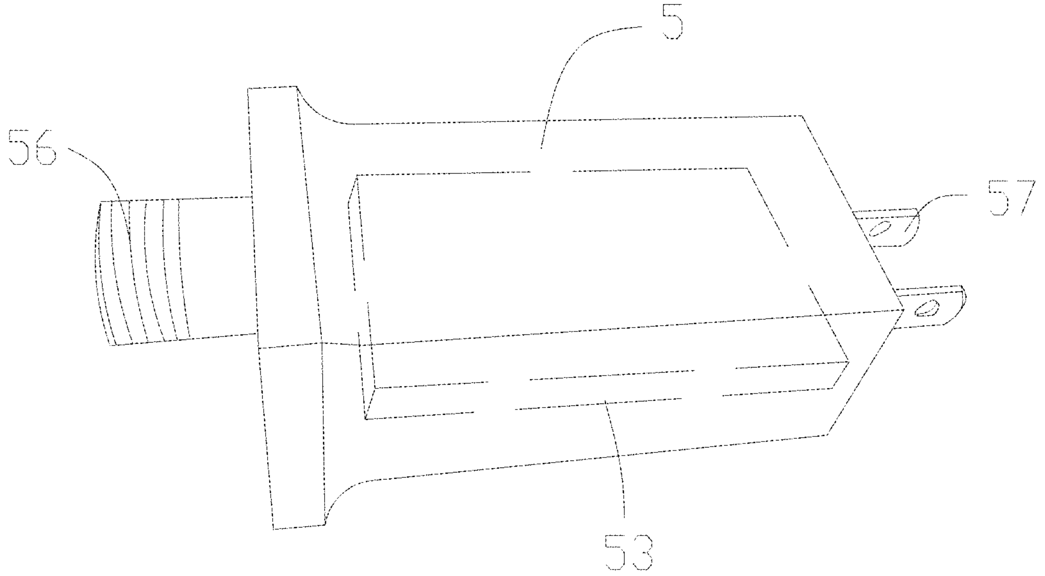
FIG. 15 is a schematic diagram of a control box in an embodiment according to the present invention.

Referring to FIG. 15, in another embodiment where the control box does not have a batteries 52, the control box 5 includes a plug 57 that is electrically connected to the circuit board 53 and configured to be connected to an external socket to introduce a power supply. The plug 57 is used to be connected to the external socket to introduce the power supply, thus forming voltage for being used by the light emitting unit 23, through conversion by the circuit board, to drive the light emitting unit 23 to work.

To facilitate the electrical connection between the control box 5 and the light emitting unit, the decorative lamp further includes a third connecting terminal that is electrically connected to the light emitting unit 23. The control box 5 further includes a fourth connecting terminal 56 electrically connected to the circuit board 53. The fourth connecting terminal 56 is detachably connected to the third connecting terminal. The circuit board 53 is electrically connected to the light emitting unit 23 when the fourth connecting terminal 56 is connected to the third connecting terminal. The third connecting terminal is the second connecting terminal 71. The fourth connecting terminal 56 is detachably connected to the third connecting terminal for storage of the decorative lamp of this embodiment when the decorative lamp is not in use. When the control box 5 is damaged, only the control box 5 needs to be replaced, thereby saving the cost. Or, when the light emitting unit 23 is damaged, a portion that is integrated with the light emitting unit 23 can be replaced, without replacing the control box 5, thereby saving the cost.

In one embodiment, the control box 5 is further provided with a hanging hole 516, and the control box 5 can be matched with an external hook 15 through the hanging hole 516, so that the control box 5 can be suspended and fixed to prevent the control box 5 from pulling the first light strings 21 and the second light strings 22.

Referring to FIG. 1-FIG. 4, in one embodiment, the hanging decorative component 1 is in a flat shape.

For example, the hanging decorative component 1 includes a hollow semicircular arc rod 11, a wave-shaped rod 12, an arc-shaped rod 13, and a plurality of connecting rods 14. Two ends of the wave-shaped rod 12 are respectively connected to and in communication with two ends of the semicircular arc rod 11. Both ends of the arc-shaped rod 13 are connected to and in communication with the semicircular arc rod 11. The plurality of connecting rods 14 are arranged at intervals. Two ends of the connecting rods 14 are respectively connected to and in communication with the arc-shaped rod 13 and the wave-shaped rod 12. That is, an interior of the hanging decorative component 1 is in communication, so as to facilitate a distribution of the first light strings 21.

Specifically, in order to reduce a total number of the first light strings 21, one of the first light strings 21 is partially placed inside the semicircular arc rod 11 and distributed along a lengthwise direction of the semicircular arc rod 11. One of the first light strings 21 is partially placed inside the wave-shaped rod 12 and distributed along a lengthwise direction of the wave-shaped rod 12. One of the first light strings 21 penetrates through a bottom of one of the connecting rods 14, passes through the arc-shaped rod 13, and then exits from a bottom of another connecting rod 14.

In order to form a structure of a parachute and facilitate an electrical connection between the light string component and the circuit board 53, one end of the plurality of first light strings 21 positioned on a left side of a central axis of the hanging decorative component 1 is electrically connected to one of the second light strings 22, and one end of the plurality of first light strings 21 positioned on a right side of the central axis of the hanging decorative component 1 is electrically connected to one of the second light strings 22.

In one embodiment, a total number of the connecting rods 14 is four, and two of the first light strings 21 are partially placed inside the middle two connecting rods 14 respectively. In other embodiments, the total number of the connecting rods 14 can also be two, one, three, five, etc., and the total number of the connecting rods 14 is not limited here.

In one embodiment, the hanging decorative component 1 includes a first housing body 103 and a second housing body 101 that is detachably connected to the first housing body 103. In the stored state, the first housing body 103 and the second housing body 101 are folded in half. In an unfolded state, the first housing body 103 and the second housing body 101 are horizontally arranged side by side on the left and the right. During transportation of the product, the hanging decorative component 1 can be folded in half to further reduce the volume of the decorative lamp.

Specifically, in one embodiment, the first housing body 103 and the second housing body 101 are rotatably arranged. The first housing body 103 and the second housing body 101 can be rotatably connected through a shaft rod, or the first housing body 103 and the second housing body 101 are rotatably connected through a hinge.

It should be understood that the semicircular arc rod 11, the wave-shaped rod 12, the arc-shaped rod 13, and the plurality of connecting rods 14 together can form the first housing body 103, the second housing body 101, and connecting housing bodies 102.

In other embodiments, the hanging decorative component 1 further includes the connecting housing bodies 102. Two ends of the connecting housing bodies 102 are detachably connected to the first housing body 103 and the second housing body 101 respectively, so that when the connecting housing bodies 102, the first housing body 103, and the second housing body 101 are separated, the connecting housing bodies 102, the first housing body 103, and the second housing body 101 can be folded. A hook 15 is provided on one of the connecting housing bodies 102, and the decorative lamp in this embodiment can be suspended in the air through the hook 15.

In one embodiment, the first housing body 103 is provided with a first fixing block 1031 on one side close to the connecting housing bodies 102, and the second housing body 101 is provided with a second fixing block 1011 on one side close to the connecting housing bodies 102. The connecting housing bodies 102 are provided with a first fixing position 1021 and a second fixing position 1022 at positions respectively corresponding to the first fixing block 1031 and the second fixing block 1011. The first fixing block 1031 is placed in the first fixing position 1021 when the connecting housing bodies 102 are connected to the first housing body 103, and the second fixing block 1011 is placed in the second fixing position 1022 when the connecting housing bodies 102 are connected to the second housing body 101, so that the connecting housing bodies 102 can be detachably connected to the first housing body 103 and the second housing body 101.

In order to facilitate the production and manufacturing of the hanging decorative component 1 and the assembly of the first light strings 21, the first housing body 103, the connecting housing bodies 102, and the second housing body 101 all include a third front housing 16 and a third bottom housing 17. The third bottom housing 17 is connected to the third front housing 16 to form a second accommodating cavity 171.

In one embodiment, the third bottom housing 17 or the third front housing 16 is provided with second position limiting columns 172 on one side near the second accommodating cavity 171. The second position limiting columns 172 are provided with second position limiting openings 173 for limiting positions of the first light strings 21. By using the second position limiting openings 173 to limit the positions of the first light strings 21, the third bottom housing 17 is connected to the third front housing 16.

Specifically, in the above embodiments, a total number of the connecting housing bodies 102 is three, and the connecting housing bodies 102 are respectively positioned in a middle of the semicircular arc rod 11, the wave-shaped rod 12, and the arc-shaped rod 13. Of course, in other embodiments, the total number of the connecting housing bodies 102 can also be one, two, four, etc. Manufacturers can configure according to a shape of the hanging decorative component 1, and the total number of the connecting housing bodies 102 is not limited here.

In one embodiment, a counterbore is provided on the third front housing 16, and a stud is provided on the third bottom housing 17. The third front housing 16 is locked onto the stud after a screw passes through the counterbore, thereby achieving connection between the third front housing 16 and the third bottom housing 17. Of course, in other embodiments, the third front housing 16 can also be fixed to the third bottom housing 17 through buckles, gluing, and other means.

Figure 9:
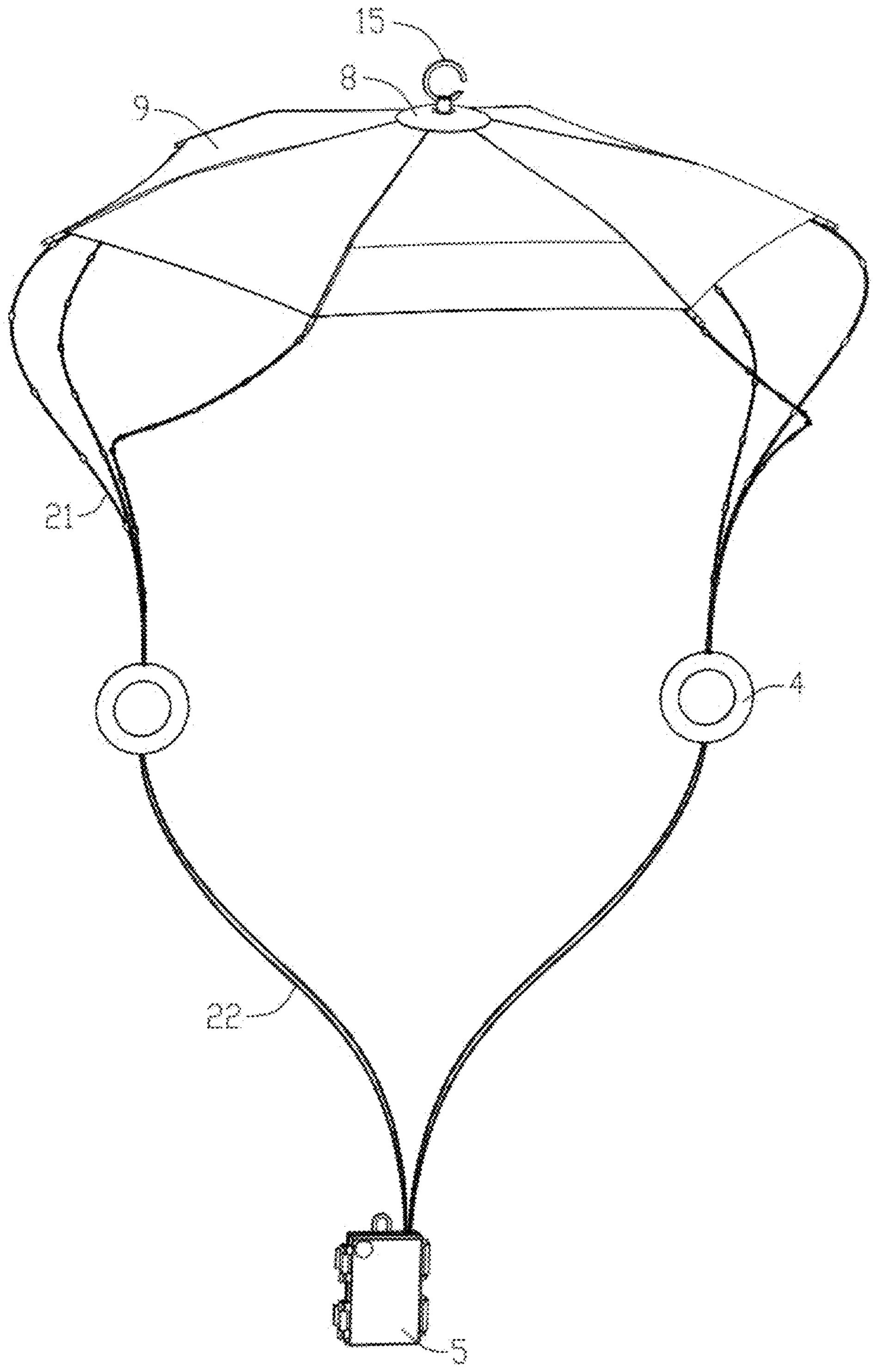
FIG. 9 is a perspective view of another embodiment according to the present invention.
Figure 10:
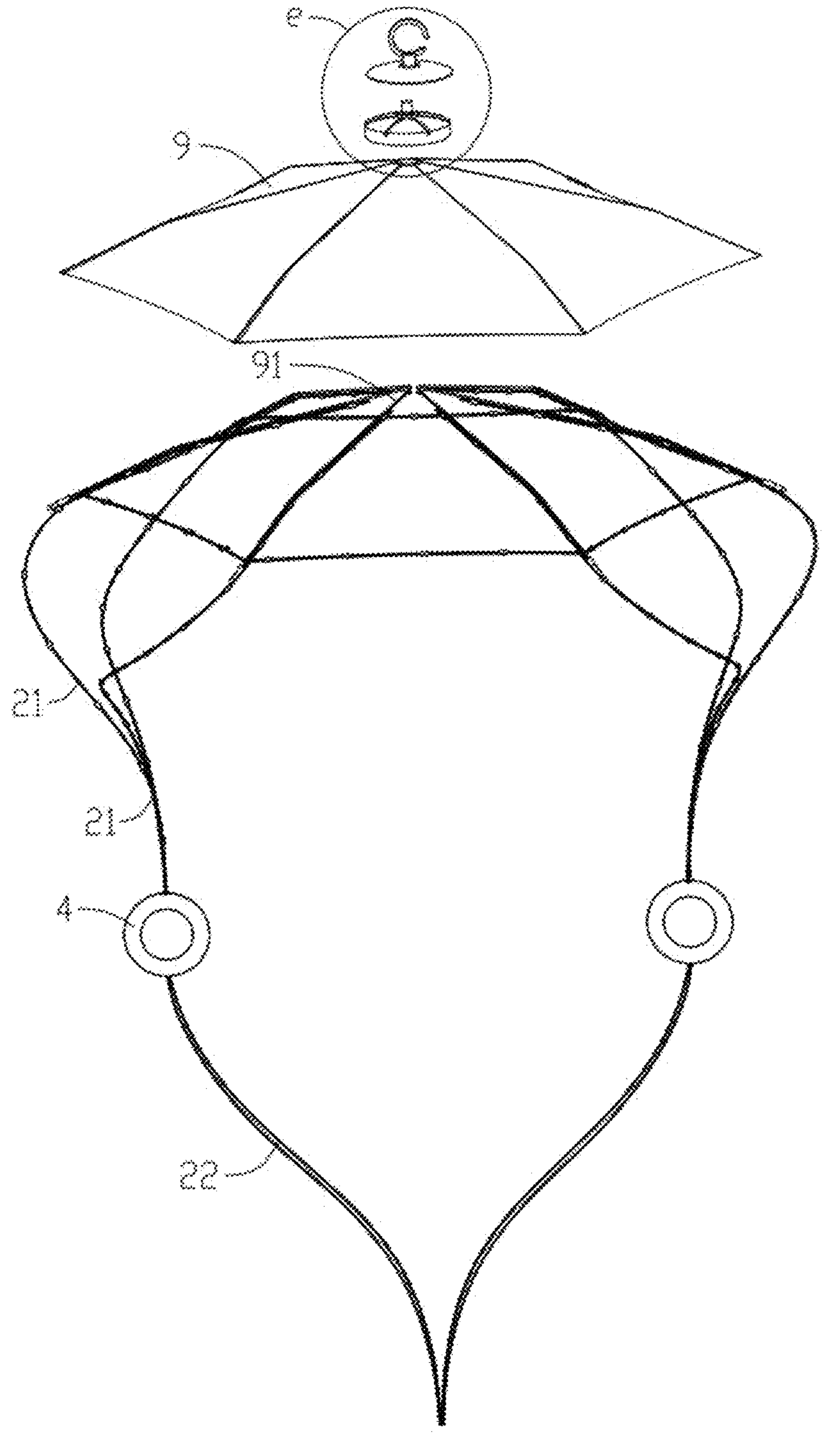
FIG. 10 is a partial exploded view of another embodiment according to the present invention.
Figure 11:
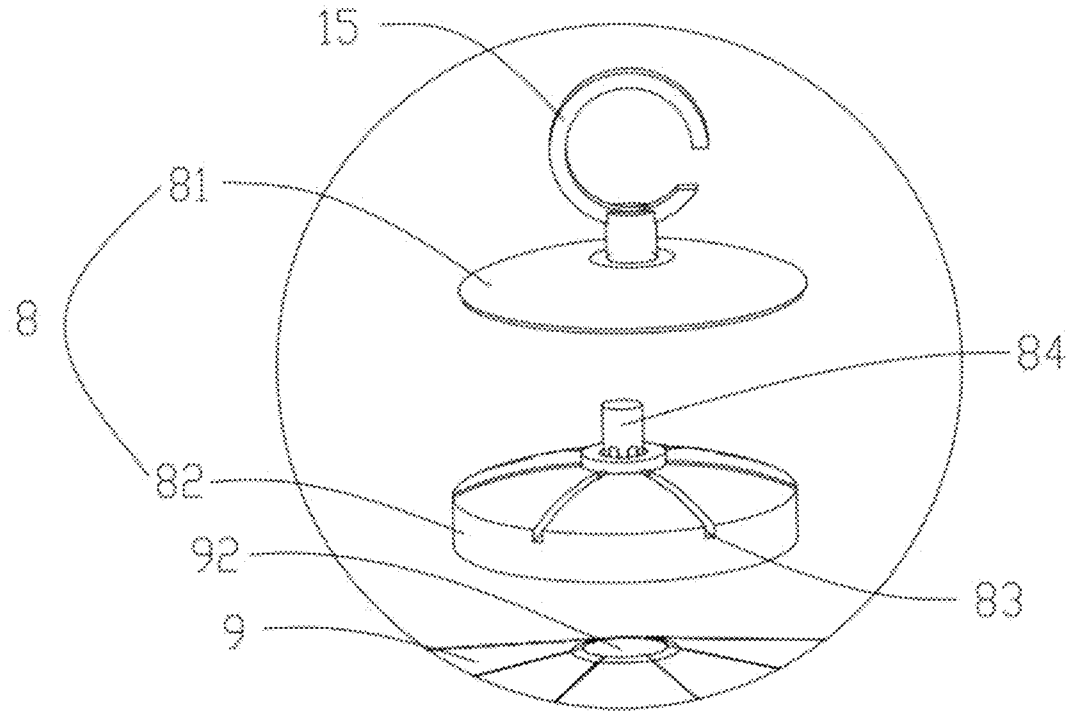
FIG. 11 is an enlarged view of area e in FIG. 10.

Referring to FIGS. 9-11, in one embodiment, the hanging decorative component 1 includes a flexible surface 9, a plurality of supporting rods 91 arranged on the flexible surface 9, and a fixed component 8 detachably connected to the flexible surface 9. When the fixed component 8 is connected to the flexible surface 9, the supporting rods 91 are fixed, so that the flexible surface 9 is unfold. When the fixed component 8 is not assembled with the flexible surface 9, the plurality of supporting rods 91 draw closer to each other in pace with the folding of the flexible surface 9, so that the hanging decorative component 1 forms an umbrella shape, and the flexible surface 9 becomes an umbrella surface, so as to achieve the folding of the hanging decorative component 1 during transportation. In order to achieve a lighting effect of the umbrella, one of the first light strings 21 is partially distributed along a periphery of the flexible surface 9, and each of the remaining first light strings 21 is partially distributed along one of the supporting rods 91. Specifically, the first light strings 21 can be fixed on a flexible component by gluing, and the flexible component can be made of cloth, rubber, etc.

In one embodiment, the fixed component 8 includes a base 82 and a front board 81 detachably connected to the base 82. A hook 15 is provided on the front board 81. A second via hole 92 is provided on the flexible surface 9. The base 82 is provided with a plurality of position limiting slots 83 for limiting positions of the supporting rods 91. When the fixed component 8 is assembled to the flexible surface 9, the base 82 is positioned on an inner side of the flexible surface 9, and the front board 81 is positioned on an outer side of the flexible surface 9. The base 82 or the front board 81 at least partially passes through the second via hole 92. That is, the fixed component 8 can be clamped on the flexible surface 9. The plurality of supporting rods 91 are each placed in one of the position limiting slots 83. By fixing the supporting rods 91, the flexible surface 9 is propped apart. When the front board 81 is separated from the base 82, the plurality of supporting rods 91 can be folded and stacked together.

In one embodiment, a screw hole is defined in the front board 81, and a screw rod 84 is provided on the base 82. When the front board 81 is assembled with the base 82, the screw rod 84 passes through the second via hole 92 and then is tightened into the screw hole, thereby achieving a detachable connection between the front board 81 and the base 82.

In the above embodiments, the first light strings 21 and the second light strings 22 both include two conductive wires and light emitting units 23. Two pins of the light emitting units 23 are welded to the two conductive wires and wrapped in an insulation layer. By gluing at positions of the light emitting units 23, connections where the light emitting units 23 are connected to the conductive wires are wrapped to achieve waterproof effect.

The above description only describes embodiments of the present disclosure, and is not intended to limit the present disclosure; various modifications and changes can be made to the present disclosure. Any modifications, equivalent substitutions, and improvements made within the spirit and scope of the present disclosure are intended to be included within the scope of the present disclosure.

What is claimed is:

1. A decorative lamp, comprising:

a hanging decorative component for hanging the decorative lamp in the air;

a plurality of connecting components connected to the hanging decorative component, wherein the connecting components are flexible components; and a decorative component connected to the connecting components, wherein at least two of the connecting components are in a folded state in a direction close to the decorative component; and at least one of the hanging decorative component, each connecting component, and the decorative component is provided with a light emitting unit for emitting light;

wherein the hanging decorative component is a 3D parachute; the 3D parachute comprises a flexible surface, a plurality of supporting rods arranged on the flexible surface, and a fixing assembly; the fixing assembly is configured to lock the plurality of supporting rods to support unfolding of the flexible surface when the flexible surface is unfolded; in the stored state, the flexible surface is folded along a central axis surrounded by the plurality of supporting rods; and the connecting components are connected to the flexible surface or the supporting rods.

2. The decorative lamp according to claim 1, wherein the decorative component comprises at least one ring component; and at least two of the connecting components are connected to the ring component.

3. The decorative lamp according to claim 2, wherein the at least one ring component comprises two ring components; the decorative component further comprises an intermediate body and supporting arms respectively connected to two sides of the intermediate body; the two supporting arms are each connected to one ring component; and the supporting arms are detachably connected to the two ring components.

4. The decorative lamp according to claim 3, wherein tape bodies are arranged on the supporting arms; two ends of the tape bodies are detachably connected; and when the tape bodies sleeve the ring components, the two ends of the tape bodies are connected.

5. The decorative lamp according to claim 1, further comprising a control box, wherein a circuit board electrically connected to the light emitting unit and configured to control the light emitting unit is arranged in the control box.

6. The decorative lamp according to claim 5, wherein the control box is provided with a function button electrically connected to the circuit board; and the circuit board adjusts power output to the light emitting unit and/or switches a light emitting mode of the light emitting unit when the function button is operated.

7. The decorative lamp according to claim 5, wherein a battery electrically connected to the circuit board is arranged in the control box.

8. The decorative lamp according to claim 7, wherein the control box is provided with a first connecting terminal electrically connected to the circuit board; the decorative lamp further comprises a second connecting terminal electrically connected to the light emitting unit; the first connecting terminal is detachably connected to the second connecting terminal; and the circuit board is electrically connected to the light emitting unit when the first connecting terminal is connected to the second connecting terminal.

9. The decorative lamp according to claim 7, wherein a solar panel electrically connected to the circuit board is arranged on the control box; and the solar panel is configured to: convert solar energy into electrical energy and store the electrical energy in batteries through the circuit board.

10. The decorative lamp according to claim 5, wherein the control box comprises a plug electrically connected to the circuit board and configured to be connected to an external socket to introduce a power supply.

11. The decorative lamp according to claim 1, wherein the fixing assembly comprises a base and a panel detachably connected to the base; the panel is provided with a hook; the flexible surface is provided with a second via hole; the base is provided with a plurality of limiting slots for limiting the supporting rods;

when the fixing assembly is assembled to the flexible surface, the plurality of supporting rods are each placed in one limiting slot; the base is located on an inner side of the flexible surface; and the panel is located on an outer side of the flexible surface.

12. The decorative lamp according to claim 11, wherein the panel is provided with a screw hole; the base is provided with a screw rod; and the screw rod pass through the second via hole and is screwed up in the screw hole when the panel is assembled with the base.

13. A decorative lamp, comprising:

a hanging decorative component for hanging the decorative lamp in the air;

a plurality of connecting components connected to the hanging decorative component, wherein the connecting components are flexible components; and a decorative component connected to the connecting components, wherein at least two of the connecting components are in a folded state in a direction close to the decorative component; and at least one of the hanging decorative component, each connecting component, and the decorative component is provided with a light emitting unit for emitting light; wherein the hanging decorative component is flat; the hanging decorative component comprises a first housing body and a second housing body; and in an unfolded state, the first housing body and the second housing body are horizontally arranged side by side on left and right.

14. The decorative lamp according to claim 13, wherein hanging decorative component further comprises connecting housing bodies; two ends of the connecting housing bodies are respectively detachably connected to the first housing body and the second housing body; and a hook is arranged on one of the connecting housing bodies, the first housing body, or the second housing body.

15. A decorative lamp, comprising:

a hanging decorative component for hanging the decorative lamp in the air;

a plurality of connecting components connected to the hanging decorative component, wherein the connecting components are flexible components; and a decorative component connected to the connecting components, wherein at least two of the connecting components are in a folded state in a direction close to the decorative component; and at least one of the hanging decorative component, each connecting component, and the decorative component is provided with a light emitting unit for emitting light; wherein the decorative lamp is shaped like a fire balloon; the hanging decorative component has an umbrella cover appearance of the fire balloon; the plurality of connecting components are pull ropes of the fire balloon; the decorative component is a hanging basket; top ends of the connecting components are connected to the umbrella cover appearance; and bottoms of the connecting components are connected to the hanging basket.

* * * * *